Patented June 24, 1930

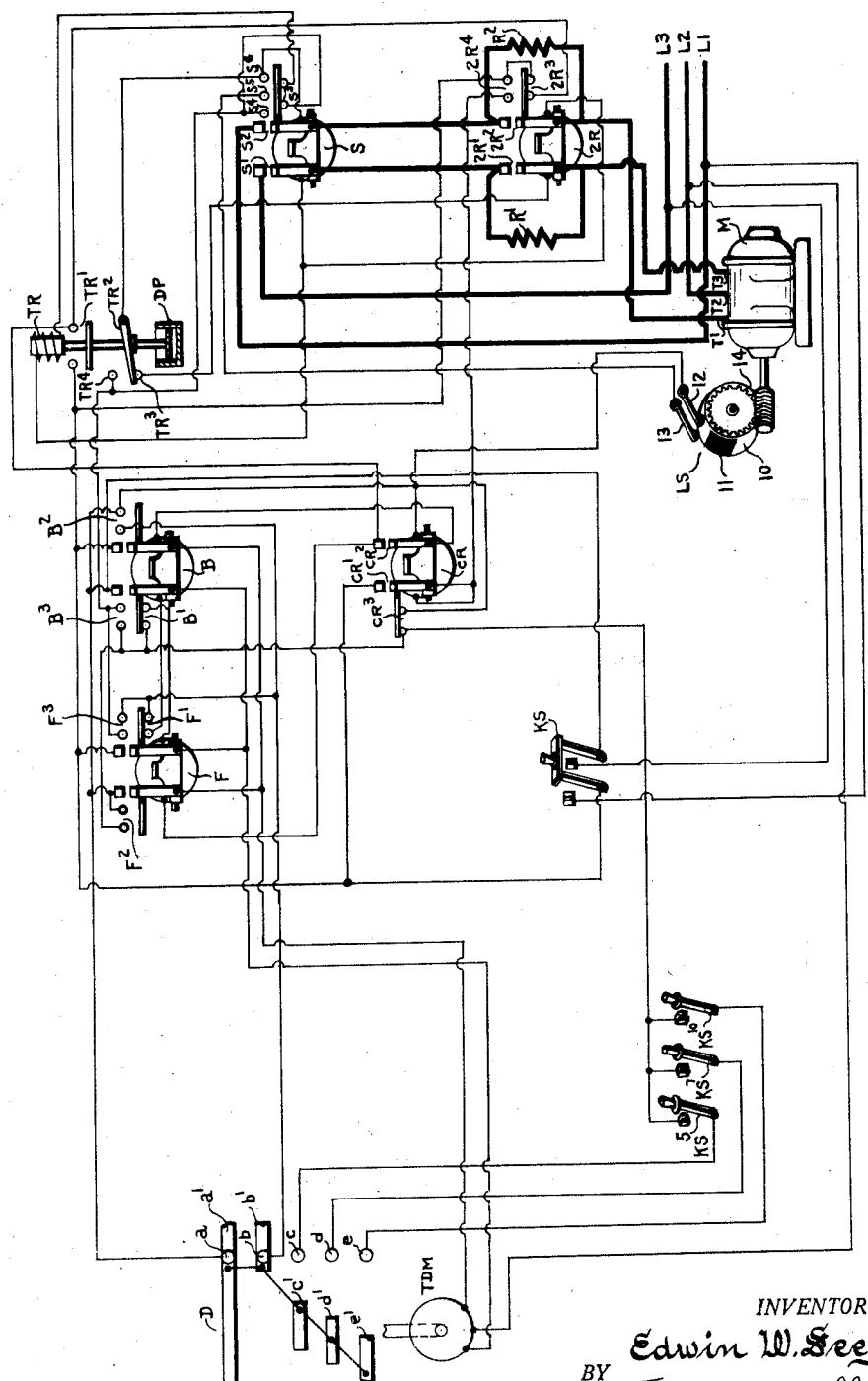

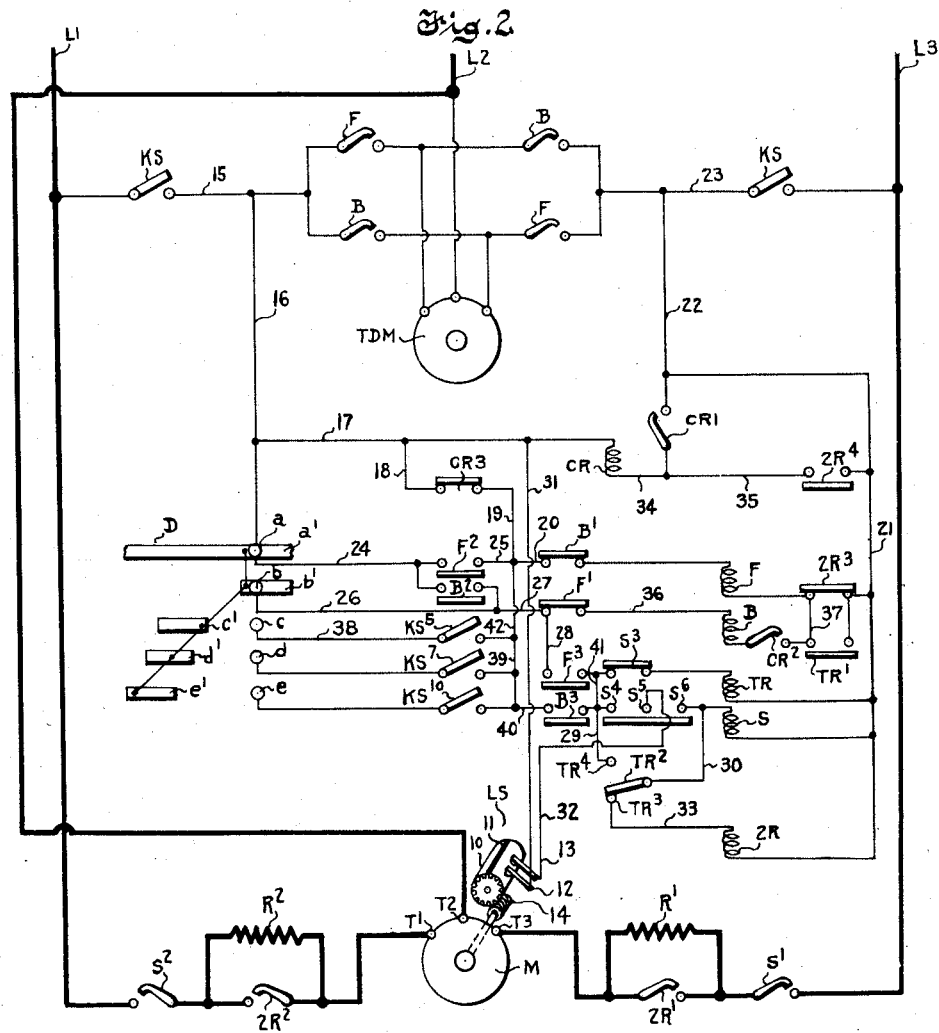

1,767,620

UNITED STATES PATENT OFFICE

EDWIN W. SEEGER, OF WAUWATOSA, WISCONSIN, ASSIGNOR, BY MESNE ASSIGNMENTS, TO CUTLER-HAMMER INC., OF MILWAUKEE, WISCONSIN, A CORPORATION OF DELAWARE

TIMING CONTROLLER FOR ELECTRIC MOTORS

Application filed July 18, 1927. Serial No. 206,561.

This invention relates to improvements in timing controllers for electric motors, and the invention relates more particularly to improvements in motor driven timing devices.

An object of the invention is to provide an improved and simplified timing controller of the aforementioned character.

Another object is to provide a timing controller including means operable by the main motor for timing the operating period of the latter and means including a reversible pilot motor and drum subject to control by said first mentioned means for timing the period of inoperation of said main motor.

Another object is to provide such a controller wherein the period of operation of the pilot motor may be definitely varied at will to provide for variation of the period of inoperation of the main motor.

Other objects and advantages of the invention will be apparent in the course of the following description.

There are many instances wherein it is desired to provide for automatic cyclic control of electric motors including starting and running thereof for a predetermined period and alternately stopping the same for a predetermined period,—the period during which the motor is stopped being preferably adjustable at will. For example, a timing device of the character herein described may be applied to control of the driving motors of various types of automatic conveyers, automatic washing machines, extractors, and the like.

The accompanying drawings illustrate an embodiment of the invention which will now be described, it being understood that various changes may be made in the details of construction and operation of the device illustrated without departing from the spirit and scope of the invention as defined by the appended claims.

In the drawings, Figure 1 illustrates schematically and diagrammatically a control system embodying the invention, and Figure 2 is an across-the-line diagram of the circuits and connections illustrated in Fig. 1.

Referring more particularly to Fig. 1, the reference character M designates a driving motor, the periods of operation and inoperation of which it is desired to control. Said motor may be arranged to drive a conveyer, washing machine, extractor, or the like (not shown). Motor M as shown is adapted to be connected with lines $L^1$, $L^3$ of a polyphase supply circuit upon closure of main contacts $S^1$, $S^2$ of an electromagnetic starting switch S; one terminal of said motor being permanently connected to line $L^2$. Switch S is provided with normally closed auxiliary contacts $S^3$ and normally open auxiliary contacts $S^4$, $S^5$ and $S^6$ for purposes hereinafter described. The motor circuit initially completed through closure of switch S includes suitable starting resistances $R^1$, $R^2$; whereas within a predetermined period thereafter, as determined by the adjustment of a timing relay TR, switch 2R is adapted to close its normally open main contacts $2R^1$ and $2R^2$, thereby providing accelerating and running connections for the motor. As shown switch 2R is provided with normally closed auxiliary contacts $2R^3$ and normally open auxiliary contacts $2R^4$. Also as shown the timing relay TR is provided with normally open contacts $TR^1$, and a pivoted contactor $TR^2$ normally engaging a contact $TR^3$ but movable out of engagement with the latter and into engagement with a contact $TR^4$, as hereinafter more fully described.

The means for controlling the duration of operation of motor M may comprise a limit switch LS in the form of a drum having a relatively long conducting segment 10 and a relatively short insulating segment 11,—the latter being adapted to interrupt circuit through co-operating contact fingers 12 and 13 upon rotation of said drum by motor M through suitable reduction gearing 14.

The means for controlling the period of inoperation of motor M includes a drum D having contact fingers $a$, $b$, $c$, $d$ and $e$ adapted to co-operate with corresponding segments $a^1$, $b^1$, $c^1$, $d^1$ and $e^1$. Drum D is adapted to be driven by a reversible pilot motor TDM,—reverse circuit connections for said pilot motor being controllable by suitable electromagnetically operable switches F and B selectively. As shown switch F is provided with normally closed auxiliary contacts $F^1$ and normally open auxiliary contacts $F^2$ and $F^3$, whereas switch B is likewise provided with normally closed auxiliary contacts $B^1$ and normally open auxiliary contacts $B^2$ and $B^3$.

Completion of an energizing circuit for pilot motor TDM is dependent upon prior closure of a double-pole knife switch KS or the like; whereas the single-pole knife switches $KS^6$, $KS^7$ and $KS^{10}$ are respectively adapted when closed individually to determine the operating period of said pilot motor.

An electromagnetically operable relay CR is also provided for purposes hereinafter described; said relay having a pair of normally open main contacts $CR^1$ and $CR^2$ and normally closed auxiliary contacts $CR^3$.

Operation of the control system will now be described with particular reference to the diagram of Fig. 2. Thus assuming positioning of the various elements as illustrated, it will be seen that upon closure of knife switch KS an energizing circuit is completed for the winding of switch F for effecting operation of pilot motor TDM in one direction. Said circuit may be traced from line $L^1$ through the left-hand pole of knife switch KS, conductors 15, 16, 17 and 18 through the normally closed auxiliary contacts $CR^3$ of relay CR, conductors 19 and 20 through normally closed auxiliary contacts $B^1$ of switch B to and through the winding of said switch F, thence through normally closed auxiliary contacts $2R^3$ of relay 2R, and by conductors 21, 22, 23 and the right-hand pole of knife switch KS to line $L^3$. Switch F in closing completes a maintaining circuit for itself shunting the afore-mentioned auxiliary contacts $CR^3$, said maintaining circuit extending from line $L^1$ to conductor 16, thence through contact finger $a$ on drum D and conductor 24 through the normally open auxiliary contacts $F^2$ of switch F, conductors 25 and 20 through the auxiliary contacts $B^1$, and thence through the winding of switch F to line $L^3$ as previously traced.

Also upon closure of normally open auxiliary contacts $F^3$ of switch F an energizing circuit is completed for the winding of timing relay TR, said circuit extending from line $L^1$ to contact finger $a$ of drum D, thence through segments $a^1$ and $b^1$ of said drum to contact finger $b$, conductors 26, 27 and 28 through said auxiliary contacts $F^3$, thence through normally closed auxiliary contacts $S^3$ of main switch S, through the winding of said relay TR to conductor 21, and to line $L^3$ as previously traced.

Relay TR thereupon operates immediately to effect engagement of its contactor $TR^2$ with contact $TR^4$, thereby completing an energizing circuit for the winding of main switch S, said circuit extending from line $L^1$ to auxiliary contacts $F^3$ as previously traced, thence by conductors 41 and 29 to said contact $TR^4$ and contactor $TR^2$, by conductor 30 through the winding of said switch S, and by conductor 21 to line $L^3$ as previously traced. The main contacts $S^1$, $S^2$ of switch S in closing provide starting connections for main motor M, said starting circuit including resistances $R^1$, $R^2$ as will be obvious.

Switch S is also adapted upon closure of its normally open auxiliary contacts $S^4$ and $S^6$ to provide a maintaining circuit for itself shunting the contact $TR^4$ and contactor $TR^2$ of relay TR, said shunt circuit being obvious. Also upon closure of normally open auxiliary contacts $S^5$ and $S^6$ of switch S an additional or alternative maintaining circuit is provided for the latter, said circuit extending from line $L^1$ to conductor 17 as previously traced, by conductor 31 to contact finger 12, thence through segment 10 of the contact drum driven by motor M and to contact finger 13 thereof, by conductor 32 to said auxiliary contacts $S^5$ and $S^6$, and through the winding of switch S to line $L^3$ as previously traced.

Switch S in closing also effects opening of its normally closed auxiliary contacts $S^3$, thereby interrupting the afore-described energizing circuit for the winding of relay TR. Upon de-energization of relay TR the contactor $TR^2$ thereof tends to immediately assume its normal position wherein it engages contact $TR^3$, but re-engagement of said elements is subject to a delay through the action of down-dashing dashpot DP (Fig. 1). However, re-engagement of contactor $TR^2$ with contact $TR^3$ is effected after a predetermined time interval, thus completing an energizing circuit for the winding of accelerating switch 2R, said circuit extending from line $L^1$ to and through auxiliary contacts $S^4$ and $S^6$ as previously traced, thence by conductor 30 to and through contactor $TR^2$ and contact $TR^3$ of relay TR, by conductor 33 through said winding, and by conductor 21 to line $L^3$. The main contacts $2R^1$ and $2R^2$ of switch 2R in closing short circuit resistances $R^1$ and $R^2$ respectively, thereby providing for acceleration of motor M.

During the aforedescribed starting operation of motor M the segments $a^1$, $b^1$, etc. of drum D will have been moved slightly to the left of the positions illustrated, due to operation of pilot motor TDM in a forward direction. This will slightly upset the initial timing operation of pilot motor TDM and drum D, but the correct predetermined timing period will be insured upon each succeeding operation of the pilot motor. Thus upon closure of switch 2R in the manner aforedescribed the normally closed auxiliary contacts $2R^3$ thereof will be opened, thereby interrupting the maintaining circuit of switch F, which opens to effect stopping of the pilot motor.

Similarly upon closure of switch 2R the normally open auxiliary contacts 2R⁴ thereof are closed to provide an energizing circuit for the winding of relay CR, said circuit extending from line L¹ to conductor 17 as previously traced, thence through said winding of relay CR, conductors 34 and 35 through said auxiliary contacts 2R⁴, and by conductors 21, 22 and 23 through the right-hand pole of knife switch KS to line L³.

Upon closure of the normally open main contacts CR¹ of relay CR a maintaining circuit is provided for the winding of the latter shunting the aforementioned auxiliary contacts 2R⁴,—said shunt circuit being obvious. Also upon closure of relay CR the main contacts CR² thereof are closed to preset the energizing circuit for the winding of switch B for completion upon operation of timing relay TR in the manner hereinafter described. Similarly upon closure of relay CR the normally closed auxiliary contacts CR³ thereof are opened, thus rendering completion of the initial energizing circuit of switch F subject to closure of one of the knife switches KS⁵, KS⁷ or KS¹⁰ and further subject to engagement of the corresponding segment c¹, d¹, or e¹, with its co-operating contact finger c, d or e.

Thus after stopping of pilot motor TDM in the manner aforedescribed the motor M continues to operate for a period determined by the length of segment 10 of the drum driven by motor M. However, when the insulating segment 11 is brought into engagement with the contact fingers 12 and 13 the aforedescribed alternative maintaining circuit for switch S is interrupted, and switch S opens to disconnect motor M from the line; it being noted that the other maintaining circuit for switch S was interrupted through re-opening of normally open auxiliary contacts F³ of switch F. The energizing circuit for the winding of accelerating switch 2R is likewise interrupted, and this switch in opening effects reclosure of its auxiliary contacts 2R³, thereby completing the aforementioned energizing circuit for the winding of switch B; said circuit extending from line L¹ to conductor 26, as previously traced, by conductor 27 through normally closed auxiliary contacts F¹ of switch F, conductor 36 through said winding of switch B, contacts CR² of relay CR (which is then in closed position as aforedescribed), thence by conductor 37 through auxiliary contacts 2R³ of relay 2R, and by conductor 21 to line L³ as previously traced.

Switch B in closing completes a circuit for pilot motor TDM to effect operation thereof in a reverse direction from that aforedescribed; whereas said switch in closing completes a maintaining circuit for itself (through its auxiliary contacts B²) independently of the segment b¹ of drum D. Thus assuming closure of knife switch KS⁵ to provide for operation of the pilot motor TDM for a predetermined period,—say five minutes—said pilot motor will effect rotation of drum D in a reverse direction from that aforedescribed until the segment c¹ in traveling from left to right engages contact finger c of drum D. An energizing circuit is thereupon completed for the winding of timing relay TR, said circuit extending from line L¹ to contact finger a of drum D, thence to drum segments a¹, c¹ and contact finger c, by conductor 38 through said knife switch KS⁵, conductors 39 and 40 through normally open auxiliary contacts B³ of switch B (which is then in closed position), by conductor 41 through auxiliary contacts S³ of switch S, thence through the winding of said relay TR and by conductor 21 to line L³.

Relay TR in effecting engagement of its contactor TR² with contact TR⁴ completes an energizing circuit for the winding of switch S, said circuit extending from line L¹ to auxiliary contacts B³ as just traced, thence by conductor 29 through contact TR⁴ and contactor TR², conductor 30 through the winding of switch S, and thence by conductor 21 to line L³. Switch S thereupon closes to again complete the energizing circuit for motor M, whereas the normally open auxiliary contacts S⁴ and S⁶ of said switch in closing provide a maintaining circuit therefor shunting the contacts of relay TR; said maintaining circuit as shown including the aforementioned auxiliary contacts B³ of switch B. Moreover, after closure of auxiliary contacts S⁵ and S⁶ of switch S, and upon movement of conducting segment 10 of limit switch LS into bridging relation to contact fingers 12 and 13, an alternative maintaining circuit is provided which is independent of the auxiliary contacts B³ of switch B,—said last mentioned maintaining circuit having been previously described.

Moreover, upon closure of switch S the auxiliary contacts S³ are opened to interrupt the energizing circuit of relay TR. De-energization of said relay effects reopening of its contacts TR¹ as will be obvious,—whereas after a predetermined period (dependent upon the action of dashpot DP, Fig. 1) contactor TR² engages contact TR³ to complete the energizing circuit for the winding of accelerating switch 2R, with the results aforedescribed. Likewise upon closure of switch 2R the auxiliary contacts 2R³ thereof are opened, thereby interrupting the maintaining circuit of switch B, which opens to effect stopping of the pilot motor.

Under the conditions last described segment b¹ of drum D has been moved to the right of contact finger b; whereas segment c¹ is in engagement with the contact finger c of said drum when operation of pilot motor TDM is stopped. After a predetermined period of operation of motor M the insulating segment 11 of limit switch LS engages contact fingers 12 and 13 to interrupt the energizing circuits of switches S and 2R, as will be obvious,—thus again stopping said motor M. Moreover, under these conditions, upon de-energization of switch 2R the auxiliary contacts 2R³ thereof are closed, thus completing an energizing circuit for the winding of switch F. Said energizing circuit extends from line L¹ to segment $c^1$ and contact finger $c$ of drum D, conductor 38 through knife switch KS⁵, conductors 42 and 20 through normally closed auxiliary contacts B¹ of switch B (which is then in open position), thence through the winding of switch F and auxiliary contacts 2R³ of switch 2R, and by conductor 21 to line L³.

Thereupon switch F closes and provides a maintaining circuit for its winding through auxiliary contacts F², as aforedescribed. In this manner pilot motor TDM is operated in a forward direction until the segment $b^1$ of the drum D in moving toward the left again engages contact finger $b$; whereupon the aforedescribed energizing circuit for the winding of timing relay TR is again completed, due to prior closure of auxiliary contacts F³ of switch F. Similarly such closure of timing relay TR completes the initial energizing circuit for the winding of switch S, and all of the operations aforedescribed are repeated in sequence pending manual reopening of knife switch KS.

It will be noted that during operation of the system the drum segment $b^1$ moves to the right of contact finger $b$ through a distance equal to the amount of movement required to effect engagement of segment $c^1$ with contact finger $c$. Therefore the duration of operation of pilot motor TDM in a forward direction will be equal to the duration of operation thereof in the reverse direction. Moreover, it will be apparent from the foregoing that if either of the knife switches KS⁷ or KS¹⁰ is closed while knife switch KS⁵ remains open, the duration of operation of pilot motor TDM in a reverse direction may be definitely varied, (say, to seven minutes or ten minutes) whereas the duration of operation of said pilot motor in a forward direction will be correspondingly varied.

While I have illustrated an arrangement of drum segments $c^1$, $d^1$, $e^1$ and associated knife switches KS⁵, KS⁷ and KS¹⁰ for preselecting the time period of operation of the pilot motor (during which the main motor M remains inoperative), it is to be understood that if desired the pilot motor may be arranged to operate a single pair of contacts with an adjustable cam for obtaining different time intervals.

Also while I have illustrated means for providing a fixed period of operation of main motor M it will be apparent to those skilled in the art that any suitable or well known means, such as adjustable cone pulleys or a disk drive, may be provided for driving limit switch LS to permit variation of the operating period of said main motor.

What I claim as new and desire to secure by Letters Patent is:

1. In a motor control system, in combination, a unidirectionally operable main driving motor and a reversible pilot motor, each of said motors having a limit switch to be driven thereby, means operable automatically upon normal positioning of the parts to complete an initial energizing circuit for said pilot motor independently of said limit switches, said means being thereupon also operable to complete an energizing circuit for said main motor and to effect interruption of the energizing circuit of said pilot motor, means for maintaining the energizing circuit of said main motor pending a predetermined operation of the limit switch driven thereby, and means controlled by said last mentioned limit switch and cooperating with the limit switch of said pilot motor to thereupon complete an energizing circuit for said pilot motor to effect operation of the latter in a reverse direction.

2. In a motor control system, in combination, a unidirectionally operable main driving motor and a reversible pilot motor, each of said motors having a limit switch to be driven thereby, means operable automatically upon normal positioning of the parts to complete an initial energizing circuit for said pilot motor independently of said limit switches, said means being thereupon also operable to complete an energizing circuit for said main motor and to effect interruption of the energizing circuit of said pilot motor, means for maintaining the energizing circuit of said main motor pending a predetermined operation of the limit switch driven thereby, and means controlled by said last mentioned limit switch and cooperating with the limit switch of said pilot motor to thereupon complete an energizing circuit for said pilot motor to effect operation of the latter in a reverse direction, said last mentioned limit switch including a plurality of elements each operable selectively to predetermine the duration of operation of said pilot motor in opposite directions respectively.

In witness whereof, I have hereunto subscribed my name.

EDWIN W. SEEGER.